Aug. 24, 1965   C. R. SMALLMAN   3,202,094
METAL STENCILS AND PROCESS FOR MAKING THEM
Filed Oct. 2, 1961   2 Sheets-Sheet 1

INVENTOR.
Carl Russell Smallman
BY
Attorney

Aug. 24, 1965          C. R. SMALLMAN          3,202,094
METAL STENCILS AND PROCESS FOR MAKING THEM
Filed Oct. 2, 1961                              2 Sheets-Sheet 2

INVENTOR.
Carl Russell Smallman
BY
Attorney

United States Patent Office 3,202,094
Patented Aug. 24, 1965

3,202,094
METAL STENCILS AND PROCESS FOR MAKING THEM
Carl Russell Smallman, Lexington, Mass., assignor to Arthur D. Little, Inc., Cambridge, Mass., a corporation of Massachusetts
Filed Oct. 2, 1961, Ser. No. 142,186
5 Claims. (Cl. 101—128.2)

This invention relates to a novel metal stencil or mask and to a process for making it.

For many processes it is desirable to be able to deposit metals or metal oxides from the vapor phase onto a substrate in a desired pattern. It is particularly desirable to be able to make printed circiuts in this manner, especially those to be used for the construction of such circuit elements as cryotrons, tunneltrons, and the like. These elements are conveniently formed by printing circuits of various configurations, a process comprising superimposing very thin layers of various metals one on the other on a substrate. This is normally done by vacuum tehcnology, and masks are used to control the pattern deposition of the thin metal layers from the vapor phase.

The masks which are used are normally prepared by covering a metal surface with a resist which is marked in the desired pattern (such as photographically) and then the pattern lines etched to dissolve away the metal thus forming the mask or stencil. Through may years of practicing this technique it has come to be realized that the width or thickness of any line or indicia which can be etched into a metal plate is not only a function of the width defined in the resist pattern, but is also directly related to the thickness of the metal plate which is being etched. Thus it has become necessary to use extremely thin metal sheets for masks or stencils if thin lines of the order of 0.001 inch are required. This is due to the fact that etching takes place not only directly into and through the metal sheet but also progresses laterally. It will be appreciated therefore that the thicker the metal base used for the stencil, the greater the lateral etching which in turn means that there is a limit placed upon the width of any line or indicia by the thickness of the metal sheet used to form the mask or stencil.

The disadvantages in the etching technique have been partially overcome by using thinner and thinner sheets of metal. However, a point is reached where the metal sheets become so thin that they are difficult to handle and the resulting lacework type stencil must be mounted in some way to give it physical support. This mounting is difficult and often leads to a loss of definition and accuracy in the resulting stencil. Moreover, the mask has a tendency to warp if heating is required in fixing it to a supporting framework. Another way which suggests itself for making masks of the character desired is to mount a thin sheet of the metal to be etched on a temporary support. This support must then be removed after etching is completed and the mask fastened to some other type of a support, thus introducing difficulties in handling.

I have found, however, by the process of this invention that it is possible to make a mask of the character desired; i.e., one which can contain extremely thin lines or indicia, which does not suffer from the disadvantages described above; namely, warping, bad registry or difficulty in mounting.

It is therefore the primary object of this invention to provide a method for forming metal masks or stencils which may have patterns embodying extremely thin lines. It is another object to provide masks of the character described which are accurate, flat, and sufficiently rugged to be handled and reused over and over again. It is yet another object to provide a new and improved metal mask or stencil having very thin lines in its pattern and being suitable for making circuit elements from metals which are vacuum-deposited from the vapor phase. These and other objects will become apaprent from the following description.

By the process of my invention, I bond two metal sheets together with a special type of bonding agent. The metal sheets are of two different thicknesses, the one being extremely thin to control the width of the line or indicia which I wish to etch to make the mask, the other being of sufficient thickness to furnish the necessary support. By careful removal of the bonding agent where the pattern is etched, it is possible to construct a mask which has the extremely thin lines desired and which at the same time is accurate, flat, and rugged.

The process and product of this invention will be more fully described in detail with references to the following drawings in which FIGS. 1–12 represent the successive steps in the process of my invention employed to make the improved mask;

Turning now to the figures, it will be seen how the process of this invention is carried out to form the improved masks. The various elements used in the process will be defined after the description of the process is completed. It will be appreciated that the drawings are not to scale and that the greatly exaggerated thicknesses are shown to better represent the various elements.

Figure 1:
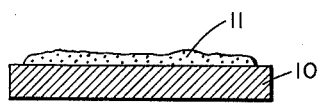
Figure 2:
Figure 3:
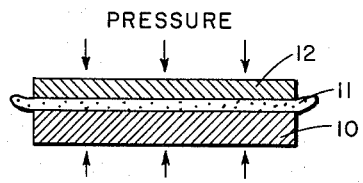

In FIG. 1, there is shown a thin metal sheet 10, for example, a beryllium copper sheet which is .007 inch thick. Onto this sheet is hot melt coated a suitable bonding agent 11, such as a polyamide. This is conveniently done by warming the sheet 10 to a temperature somewhat above the melting point of the bonding agent and rubbing it on. While the bonding agent 11 is still hot and in the melted state, a second thinner sheet 12 is placed upon the coated first sheet and pressed down as shown in FIG. 2. This second sheet is typically a sheet of copper metal about .0014 inch thick. The assembly is then put in a press and hot pressed as illustrated in FIG. 3, the inner layer of bonding agent being forced around out to or beyond the edges of the assembly. Pressure is conveniently applied by clamping the sandwich assembly between flat, heated platens under sufficient pressure to extrude the warm polyamide out to the edges. Air bubbles in this bonding layer 11 should be avoided. The assembly is then permitted to cool while between the platens. After cooling it is removed, the edges trimmed and the surfaces cleaned by scrubbing with an abrasive type cleaner and water while supporting the sandwich assembly on another flat plate.

Figure 4:
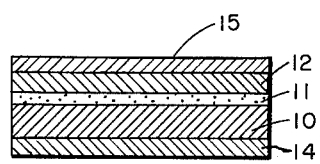
Figure 5:
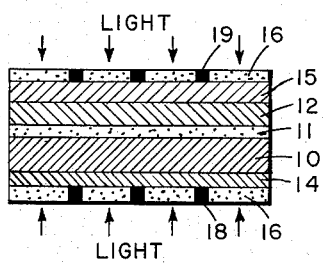
Figure 6:
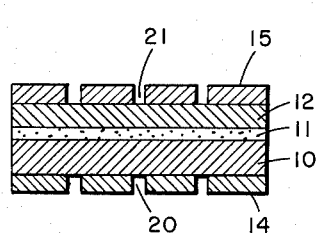

After the assembly has been cleaned as described above, it is dipped in 5% hydrochloric acid solution, rinsed in distilled water, and permitted to dry. The dry assembly is dipped in a commercially available photo-resist solution as shown in FIG. 4. Photo-resist layers 14 and 15 are formed on both surfaces of the assembly. After any excess of the resist solution has been drained off and the layers 14 and 15 dried, both sides are exposed through suitable photograph patterns 16 as shown in FIG. 5. In this figure, the indicia which are later to be etched and form the design in the mask are illustrated as the cross section 18 and 19 of dark lines. Exposure is carried out as shown in FIG. 5 from both sides, the indicia being in registry. Subsequent to exposure, the photographic pattern is developed and dried to leave an assembly such as illustrated in FIG. 6. It will be seen that in the developing process the lines 18 and 19 in FIG. 6 have been etched away to leave grooves 20 and 21 in both of the resist layers 14 and 15 which are on the thick supporting metal sheet 10 and on the thin metal sheet 12, respectively. Thus exposing and developing results in removing from both of the resists the areas corresponding to the indicia to be etched. These areas need not, of course, be lines.

Figure 7:
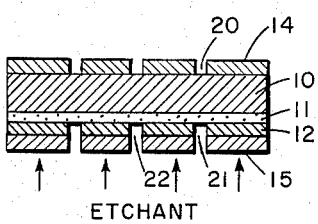

Etching is carried out in steps. In a preferred embodiment of the process of this invention the assembly is mounted horizontally so that the thin sheet 12, and its accompanying resist 15, faces downwardly; and the etchant, as illustrated in FIG. 7, is sprayed against the surface 15 and into grooves 21 to contact metal sheet 12. In the example used wherein the thick sheet is beryllium copper and the thin sheet is copper, the etchant is 35° Bé. ferric chloride at room temperature. Etching in the manner shown in FIG. 7 is continued until the thin sheet has been etched away to give the etched lines 22 in the thin sheet. Etching at this point is carried out until the bonding layer is exposed to view and/or until the grooves 22 have reached the desired width.

Figure 8:
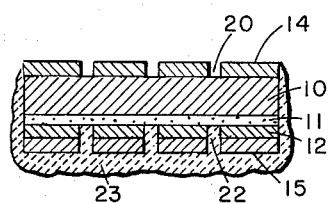

The assembly is then rinsed with water, dried and a protective layer such as commercial lacquer is painted onto the side which has been previously etched as shown in FIG. 8. The protective layer 23 is put on in such a manner that it covers not only the surface but fills the etched lines 22. This protective layer may also be waxy or fatty materials which are solids at the temperatures encountered in the process. Such materials may include lanolin or petrolatum jelly.

Figure 9:
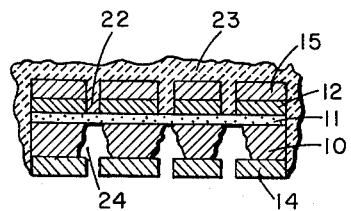

The process is then repeated with respect to the surface which is defined by the thicker layer of metal as illustrated in FIG. 9. The etching is continued in the same manner until the etched lines 24 are cut through into the thick layer and the bonding layer again shows through. The width of these etched indicia will be greater than those in the thin layer because the metal sheet is thicker.

Figure 10:
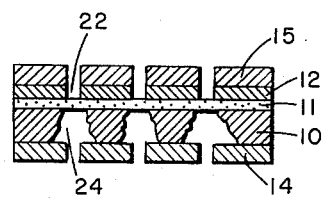
Figure 11:
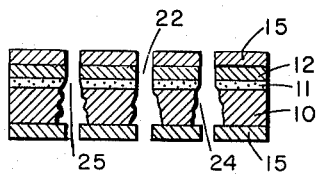

After removing the etchant, rinsing and drying, the commercial lacquer layer 23 (FIG. 8), which has protected the etched lines in the thin sheet, is removed by a suitable solvent such as methyl ethyl ketone to give the assembly shown in FIG. 10. At this point it is necessary to remove the bonding layer which lies between the etched lines 22 and 24 to permit the formation of the mask. This is done by applying a suitable solvent for the bonding layer 11 with a brush or other suitable means which results in dissolving out a line or indicia 25 in the bonding layer 11 (FIG. 11). In the case of a polyamide a mixture of isopropyl alcohol and toluene is a good solvent. It is essential at this point not to remove too much of the bonding layer by action of the solvent laterally through it. Care must also be taken to prevent any unnecessary damage to the thin layer. Finally, as a last step, the photoresist is removed from both sides with a commercial stripper suitable for this purpose.

Although it is preferable usually to etch the thinner side first, it is possible to etch the thicker side and then the thinner side. After the resist has been removed from the areas to be etched and the assembly is in the condition illustrated in FIG. 6, the thin sheet 12 and its resist 15 are coated with a protective layer such as lacquer or a wax-like material which will not damage the resist. The thick sheet 10 is then etched as in FIG. 9 and after etching has been completed and the bonding layer exposed, the temporary protective layer is removed from the thin sheet 12. The thick sheet 10 which has been etched may or may not be protected with a protective layer while the thin sheet is being etched. If etching time for the thin sheet is of short enough duration, only a slight amount of additional etching will be effected on the thick sheet and it therefore need not be protected. The thin sheet 12 is, of course, etched to expose the bonding layer as illustrated in FIG. 7. Subsequent to this etching, the protective layer, if one is used on the thick sheet, is removed and then the bonding layer is removed and the resist stripped as illustrated in FIGS. 11 and 12.

As another modification of the process of this invention, the sheets may be marked and etched one side at a time. In this case a resist is put on only one side and then exposed and developed while the other side is protected with a suitable layer such as lacquer or a wax-like material. The etching of the one sheet containing the resist is then accomplished to expose the bonding layer and if it is the thinner sheet, a protective layer will be used; but if it is the thicker sheet, this protective layer may not be necessary. Any protective layer is then removed and the resist stripped off, leaving the bonding layer intact. The process is then repeated with respect to the other side; that is, the resist is applied, exposed in registry, developed and etched, the other side which was previously etched being protected if necessary. Finally, all of the protective layers, then the bonding layer and then the resists are removed as described above.

Figure 12:
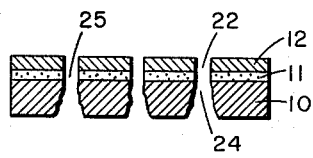

The final mask is shown in partial cross section in FIG. 12 where it will be seen that the extremely thin layer 12 has etched in it the indicia, e.g., lines 22 of the width or exact area desired, whereas the thick supporting sheet 12 has somewhat thicker lines 24 etched into it. It will be appreciated that in vacuum deposition work using the mask to make printed circuits and the like the surface defined by the thin metal layer 12 will be placed against the substrate which is to have the metal deposited upon it.

The metals used to form the thin and thick sheets of the mask of this invention may be any suitable metal which lends itself to etching. For example, it has been found that beryllium copper as the thick layer and copper as the thin layer are particularly well suited for making such masks. Beryllium copper can be tempered to make it springy and give it a desired degree of rigidity in thin sheets. Other metals which are suitable for making masks include, but are not limited to, aluminum, flexible steels, nickel, silver and gold. Alloys which can be etched are also suitable for the thick supporting sheet and thin mask sheet. Such alloys include, but are not limited to, monel, nichrome, and the common copper-containing alloys. It is also within the scope of this invention to use the same or different metals for the thin sheet and thick supporting sheet. Other nonmetallic materials which can be etched, such as glass and ceramics, can also be used as the thicker layer.

It may be desirable in choosing the metals for the mask of this invention to use two metals having different coefficients of thermal expansion; that is, to form the thinner sheet of a metal having the higher coefficient of expansion. This has an advantage in that when the mask is cooled during assembly, the thin layer will be under slight tension and will be kept completely flat on the supporting thicker layer in the event that substantial areas of sheet 12 are removed by etching because of proximity of indicia.

Figure 13:
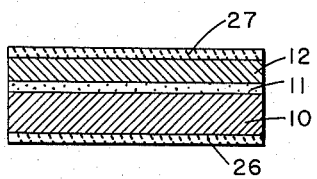
FIGS. 13–15 illustrate a modification in the mask elements.
Figure 14:
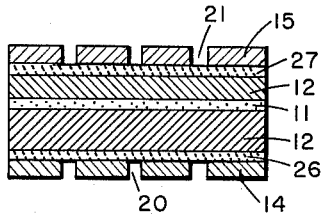
Figure 15:
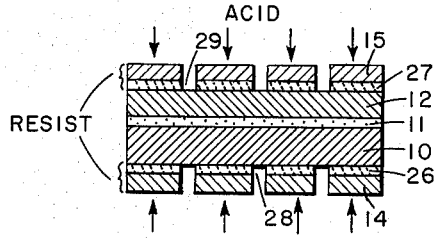

In addition to using a single metal or alloy as the thin and thick sheets of the assembly it is also possible to form the two elements 10 and 12 from metals which have extremely thin layers of another metal or alloy coated on them such as by electroplating. The thin layers thus deposited are used in the role of a more durable resist when etching is prolonged or must be carried out with an etchant which may have some effect upon the primary resist used. FIGS. 13 through 15 show such a modification of the mask and manner in which it is made. FIGS. 13 and 14 compare with FIGS. 4 and 6, while FIG. 15 illustrates the use of the thin plated metal layer as an additional resist. In this modification the thick supporting layer 10 is adhered by means of the bonding agent 11 to a thin layer 12 as in the process described above. On the thick and thin layers are coated very thin layers 26 and 27, respectively. As an example, this may be a very thin layer of chromium or nichrome electroplated to the metal layers 10 and 12; e.g., beryllium copper and copper. The photo-resist (or pressure resist) is applied to the assembly of FIG. 13 in the manner described above and developed to form grooves 20 and 21 as explained in connection with FIG. 6. In order to etch the thin coated layers 26 and 27 it is necessary to treat the assembly with a suitable etchant, such as hydrochloric acid, to rapidly etch away the lines 28 and 29 as shown in FIG. 15. At this state of the process the resist now comprises the outer layers 14 and 15 and the inner layers 26 and 27. In forming the mask in this manner it is possible to eliminate the layer 26 on the thick metal sheet 10 if so desired since the purpose of the additional resist is to make it possible to etch the very fine lines in the thin layer 12.

Figure 16:
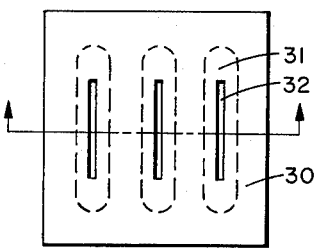
FIGS. 16 and 17 illustrate a modification of the mask of this invention showing the use of an auxiliary supporting substrate.
Figure 17:
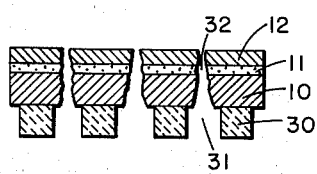

Although in most cases it will not be necessary to provide an additional auxiliary support it is within the scope of this invention to affix such a support to the mask formed. Such a mask having auxiliary support is illustrated in FIGS. 16 and 17, the former being a top plan view while the latter is a cross-sectional view. In this modification the auxiliary support plate 30 is seen to take the form of a relatively thick sheet of metal having cut therethrough apertures 31 which are larger than the indicia 32 etched in the mask and which are so positioned as to expose these indicia. In FIG. 17 the auxiliary support 30 is shown to be affixed to the thicker metal sheet 12. This may be done in any suitable manner such as the use of a resin adhesive (e.g., an epoxy), and is preferably accomplished subsequent to the removal of all of the resist system. However, if the resist 14 is strong enough, auxiliary support 30 can be attached through it to the thick sheet 12.

The etchants chosen will, of course, be those fluids (both liquid or gaseous) which are known to react with and dissolve away the metal or alloy forming the sheets which are used in the mask formation. The same etchant or different etchants may be used on the two surfaces, depending upon the metals chosen. Among the better known etchants are $FeCl_3$, the strong acids such as $HCl$, $H_2SO_4$ and $HNO_3$, and the strong alkalis such as $NaOH$, $NaNO_2$ and their mixtures.

The bonding layer should be made of a material which exhibits a low vapor pressure and has a moderately high melting point. It should also be one which can be put on in extremely even thickness and it should, of course, be capable of adhering to both of the metal or ceramic sheets. In practical application the bonding layer is a thermoplastic material which can be set up catalytically or by cooling, and preferably it is a polyamide. However, where very high temperatures are to be encountered the bonding agent may be a solder which is capable of withstanding the etchant and which can subsequently be removed. The bonding material should not require in its application the use of a solvent or a liquid which later must be removed. It must, of course, be substantially insoluble in the etchant or etchants used and soluble in some solvent or other etchant which may be used in removing it to form the mask. Finally, the bonding material is preferably one which is colored to make it more easy to determine when the bonding layer is reached in the etching process.

The resists used may be any of those which lend themselves to photographic techniques including exposure and developing, or which can be marked and removed by application of pressure to remove the areas corresponding to the indicia to be etched. They should be chemically and physically unaffected by the etchants and the protective layers used, while at the same time being themselves removable without affecting the metal sheets. Many such resists are available commercially, and are typically light-sensitive resins or polymers. For example, the cinnamic acid esters of polyvinyl alcohol or cellulose containing, as light sensitizers, substituted quinones, trinitroaniline, triphenylmethane dyes, and the like, are well suited for resist system to be used in this invention. These resin resists are coated from a solution in organic solvents, the solvents later serving as the developer for removing that portion of the resist which is not insolubilized by exposure to light; i.e., that portion which represents the indicia to be etched. There are also a number of resists available which can be marked by application of pressure (e.g., by a stylus) and these also are suitable. They, like the light-sensitive resin resists, are subsequently removable with solvents.

The protective layers (e.g., lacquers), like the resists, are well known in the art and many different kinds are available commercially. They should be essentially unreactive with the resist, the metal sheets and the bonding material and should be readily removable by the use of a solvent without chemically or physically affecting these other elements of the mask. A typical lacquer for this purpose is formed of vinyl chloride and is removable with methyl ethyl ketone. As noted above, wax-like or fatty materials and the like which are solids or semisolids at the process working temperatures are also suitable and can be removed by liquids known to be solvents for them.

The actual thicknesses of the two metal sheets will vary in accordance with the width of the lines required in the finished mask as well as with the actual size of the mask. For example, in order to form lines about 0.002 inch wide, the thin metal sheet should be about 0.001 inch thick. The thicker metal sheet should be chosen to afford the necessary support while remaining no thicker than necessary to provide this support. It will be apparent that, in general, the larger the physical dimensions of the mask, the thicker or stiffer the supporting sheet will have to be. Finally, it is desirable to maintain the bonding layer as thin as possible consistent with good uniform adhesion and uniform thickness throughout the mask.

Variations in the metals and bonding layer materials as well as ways in carrying out the steps of this process will occur to those skilled in the art and such modifications are meant to be included within the scope of this invention.

I claim:
1. A process for forming a mask adapted to have very narrow indicia etched therein, comprising the steps of
   (a) forming an assembly of sheets consisting of
      (1) a first, relatively thin, sheet of an etchable material,
      (2) a second, relatively thick, sheet of an etchable material, and
      (3) a continuous bonding layer between the uniting said first and second sheets;
   (b) affixing a first resist to the unbonded surface of said first sheet, and a second resist to the unbonded surface of said second sheet;
   (c) removing from each of said resists the areas corresponding to the indicia to be etched, thereby exposing, at said areas, the unbonded surfaces of each of said first and second sheets, said areas being in registry;
   (d) etching said first sheet with an etchant therefor, at the exposed areas in said first resist, thereby to etch through and expose said bonding layer to provide a sharp, dimensionally correct pattern of the desired size and shape for providing indicia through said mask when positioned against an object to be marked, the etching of said first sheet being without any significant undercutting;
   (e) etching said second sheet with an etchant therefor, at the exposed areas in said second resist, thereby to etch through to and expose said bonding layer, while permitting undercutting of said sheet, said sheet being of sufficient thickness that said undercutting can take place during sketching, and to provide supporting strength for said mask; said etchants being ineffective to attack said bonding layer; and (f) thereafter removing said bonding layer where so exposed by said etchants without any significant undercutting of said bonding layer, thereby to form said mask.

2. A process in accordance with claim 1 wherein said continuous bonding layer is a thermoplastic material and in forming said assembly of sheets said bonding layer is interposed between said first and second sheets by the steps of hot melt coating said thermoplastic material onto one surface of said second sheet, contacting one surface of said first sheet with said thermoplastic material while still hot, and pressing the resulting assembly to form said bonding layer in a substantially continuous film of constant thickness.

3. A process in accordance with claim 1 further characterized by including the step of affixing said second sheet after formation of said mask to an auxiliary support.

4. A process in accordance with claim 1 characterized by the additional step of fixing to the unbonded side of said first sheet a thin metallic layer thereby to form an auxiliary resist.

5. A process in accordance with claim 4 wherein said thin metallic layer is affixed by electroplating.

References Cited by the Examiner
UNITED STATES PATENTS

| | | | |
|---|---|---|---|
| 268,486 | 12/82 | Henchy et al. | 156—12 |
| 1,376,365 | 4/21 | Wertheimer | 101—128.4 X |
| 1,451,162 | 4/23 | Herr | 101—401.3 |
| 1,573,082 | 2/26 | Madden | 101—127 |
| 2,191,367 | 2/40 | Carothers. | |
| 2,282,203 | 5/42 | Norris | 101—127 |
| 2,421,607 | 6/47 | Fowler | 101—128.2 |
| 2,569,752 | 10/51 | Fowler | 101—128.3 |
| 2,829,460 | 4/58 | Golay | 101—128.3 X |
| 2,863,384 | 12/58 | Rich | 101—127 |
| 3,048,512 | 8/62 | Nelson | 156—14 |

FOREIGN PATENTS

| | | |
|---|---|---|
| 179,593 | 4/22 | Great Britain. |
| 258,277 | 5/49 | Switzerland. |

DAVID KLEIN, *Primary Examiner.*

ROBERT A. LEIGHEY, WILLIAM B. PENN,
*Examiners.*